(12) United States Patent
Cheung et al.

(10) Patent No.: US 7,388,603 B2
(45) Date of Patent: Jun. 17, 2008

(54) METHOD AND IMAGING SYSTEM WITH INTELLIGENT FRAME INTEGRATION

(75) Inventors: Frank N. Cheung, Agoura Hills, CA (US); Hector Q. Gonzalez, Torrance, CA (US)

(73) Assignee: Raytheon Company, Waltham, MA (US)

(*) Notice: Subject to any disclaimer, the term of this patent is extended or adjusted under 35 U.S.C. 154(b) by 782 days.

(21) Appl. No.: 10/457,934

(22) Filed: Jun. 10, 2003

(65) Prior Publication Data

US 2004/0252199 A1    Dec. 16, 2004

(51) Int. Cl.
*H04N 5/228* (2006.01)
*H04N 5/217* (2006.01)
*H04N 9/64* (2006.01)

(52) U.S. Cl. .............................. 348/208.14; 348/208.4; 348/208.6; 348/241; 348/248

(58) Field of Classification Search .............. 348/208.4, 348/208.14, 117, 241, 248, 169–172, 208.6
See application file for complete search history.

(56) References Cited

U.S. PATENT DOCUMENTS

| | | | | |
|---|---|---|---|---|
| 4,288,815 A | * | 9/1981 | Miles | 348/620 |
| 4,296,436 A | * | 10/1981 | Achiha | 348/620 |
| 4,437,119 A | * | 3/1984 | Matsumoto et al. | 375/240.13 |
| 4,679,086 A | * | 7/1987 | May | 348/620 |
| 5,057,921 A | * | 10/1991 | Robert et al. | 348/459 |
| 5,208,673 A | * | 5/1993 | Boyce | 348/701 |
| 5,309,237 A | * | 5/1994 | Singh | 348/607 |
| 5,442,407 A | * | 8/1995 | Iu | 348/620 |
| 2004/0201706 A1 | * | 10/2004 | Shimizu et al. | 348/208.4 |

* cited by examiner

*Primary Examiner*—Tuan Ho
*Assistant Examiner*—Richard M Bemben
(74) *Attorney, Agent, or Firm*—Schwegman, Lundberg & Woessner, P.A.

(57) ABSTRACT

An imaging system disables pixel integration for images within frames that are identified as moving while enables pixel integration for images that are not moving. The system may implement a frame-averaging type of integration or recursive types of frame integration, or may refrain from performing frame integration. On a pixel-by-pixel basis, the system may compare a pixel from frame memory with a corresponding pixel of an input frame and may disable pixel integration for the pixel when a difference between the compared pixels exceeds a threshold. One of the integration processes may be performed on the pixels when the difference does not exceed the threshold. When frame integration is disabled or de-selected (e.g., for pixels having motion), the frame memory may be bypassed and a self-integration may be performed with corresponding pixels from a current frame effectively resulting in no integration. Some embodiments may use multiple thresholds, and may use different integration algorithms depending on conditions within a scene.

6 Claims, 6 Drawing Sheets

METHOD AND IMAGING SYSTEM WITH INTELLIGENT FRAME INTEGRATION

TECHNICAL FIELD

The present invention pertains to video and image processing and in some embodiments to imaging systems.

BACKGROUND

Many conventional video imaging systems use a frame integration process to help reduce the effects of noise and to help improve the resolution or the signal-to-noise ratio of an image. These conventional systems work well under most static scene conditions where there is little or no motion. However, when the scene is moving, or when a portion of the scene changes due to moving images or objects, these conventional systems may generate motion artifacts, such as an undesired smearing effect on the output image. In some situations, for example, when a bright target moves across a dark background, the intensity of the target may actually be lowered on the output display due to the averaging nature of the integration process. The effects of these artifacts make the displayed video less acceptable, especially to the human eye. In addition, these artifacts make it more difficult to detect targets on moving images, especially on fast moving images.

Thus there is a general need for an improved imaging system and method. There is also a need for an imaging system and method that reduces or eliminates artifacts caused by moving objects while reducing the noise effects on stationary objects.

SUMMARY

An imaging system disables pixel integration for image pixels within frames that are identified as moving while enables pixel integration for image pixels that are identified as not moving. The system may implement a frame-averaging type of integration or recursive types of frame integration. On a pixel-by-pixel basis, the system may compare a pixel from frame memory with a corresponding pixel of an input frame and may disable pixel integration for the pixel when a difference between the compared pixels exceeds a threshold. Changes in color and intensity between corresponding pixels may be measured. One of the integration processes may be performed on the pixels when the difference does not exceed the threshold. When frame-averaging integration is selected, a frame memory may store a prior input frame, and pixels from a current frame are compared with corresponding pixels of the prior input frame. When a recursive type of frame integration is selected, the frame memory may store one or more prior output frames, and pixels from the current frame are compared with corresponding pixels of the one or more prior output frames. When frame integration is disabled (e.g., for pixels having motion), a self-integration may be performed with corresponding pixels from a current frame effectively resulting in no integration.

In some embodiments, the present invention may include a target size discriminator which may identify and detect smaller moving targets on a display. In these embodiments, the threshold level for motion may be varied along with an integration factor to enhance the target's hang time on the display for improved target identification and detection.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

The present invention provides an improved imaging system and method. In embodiments, the preset invention also provides an imaging system and method that may reduce or eliminate artifacts caused by moving objects while still reducing the noise effects on stationary objects. In some embodiments, the present invention provides an imaging system and method that may improve target detection for smaller moving objects on a display.

Figure 1:
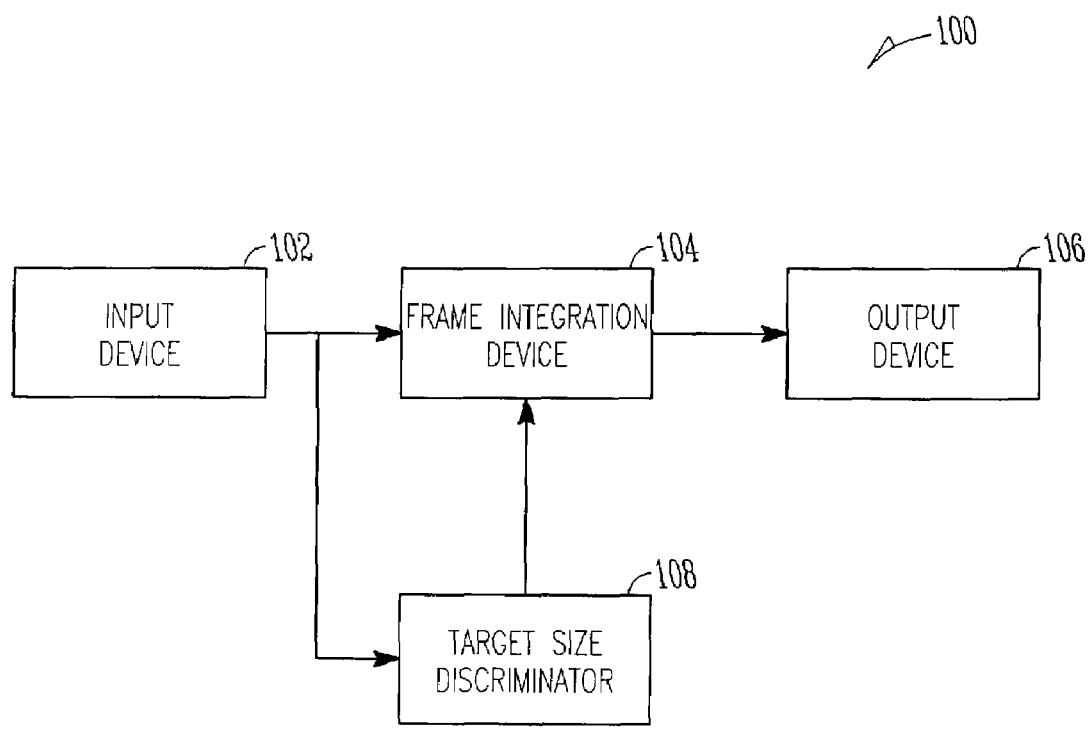
FIG. 1 is a simplified block diagram of an imaging system in accordance with embodiments of the present invention.

FIG. 1 is a simplified block diagram of an imaging system in accordance with embodiments of the present invention. Imaging system 100 comprises input device 102, frame integration device 104, and output device 106. Input device may be any video source and may generate a video output for subsequent processing by frame integration device 104. Frame integration device 104 generates output frames and provides the output frames to output device 106. Depending on the particular embodiment, output device 106 may display the frames or use the information in the frames in some other way, as described below. In embodiments, the output frames may have better resolution and/or an improved signal-to-noise ratio (SNR) than the input frames, at least for portions of the frame that do not have motion, while motion artifacts may be reduced or eliminated for portions of the frame that have motion.

Integration device 104 may implement a frame-averaging type of integration or recursive types of frame integration, or may refrain from performing frame integration. On a pixel-by-pixel basis, device 104 may compare a pixel from frame memory with a corresponding pixel of an input frame and may disable pixel integration for the pixel when a difference between the compared pixels exceeds a threshold. One of the integration processes may be performed on the pixels when the difference does not exceed the threshold. When frame-averaging integration is selected, a frame memory may store a prior input frame and pixels from a current frame are compared with corresponding pixels of the prior input frame.

When a recursive type of frame integration is selected, the frame memory may store one or more prior output frames, and pixels from the current frame are compared with corresponding pixels of the one or more prior output frames. In some cases, the frame memory may accumulate information from more than one prior frame to form an accumulated multi-frame equivalent, and the input frame may be compared with the accumulated multi-frame equivalent. When frame integration is disabled (e.g., for pixels determined to have motion based on a threshold), a self-integration may be performed with corresponding pixels from a current frame effectively resulting in no integration for these pixels. The threshold level for motion may be changed in real time to help improve target detection and recognition.

In some embodiments, system 100 may include target size discriminator 108 which may identify and detect smaller moving targets on input device 102. In these embodiments, the threshold level for motion may be varied along with an integration factor to enhance the target's hang time on the display for improved detection. This is described in more detail below.

In other embodiments, system 100 may be used to generate videos, such as videos or movies for consumer viewing. In these embodiments, input device 102 may be a video or movie camera or other video source that generates video, and output device may be a digital video disc (DVD) generator or compact disc (CD) generator. In these embodiments, frame integration device 104 processes the video and provides enhanced video to output device 106.

In other embodiments, system 100 may be part of a video playing device, such as an analog video tape player. In these embodiments, input device 102 may receive a video input from a noisy video source, frame integration device 104 may process the video, and output device 106 may be a display or storage device to display or store the processed video. Accordingly, enhanced video may be achieved from existing video sources.

In other embodiments, input device 102 may be a high-resolution camera or imaging device, such as an infrared sensor device, an RF sensor device, or a thermal imaging device. In these other embodiments, the input device may be located on aircraft, guided projectile or satellite, for example. In one embodiment, system 100 may be located entirely within a video camera. In one embodiment, the output device may be a display or target detection device used to identify a target within a non-moving portion of the image. In some of these embodiments, output device 106 may include an RF, microwave, or infrared transmitter to transmit the output video to a receiver at another location. In some embodiments, the target may be a guided projectile or even a bullet.

In these various embodiments, the term video is used to refer to any of the output signals provided by input device 102 which may be comprised of a sequence of frames comprised of a plurality of pixels. In some embodiments, infrared, RF and thermal data may be converted to visual (video) signals by input device 104; however this is not a requirement.

Figure 2:
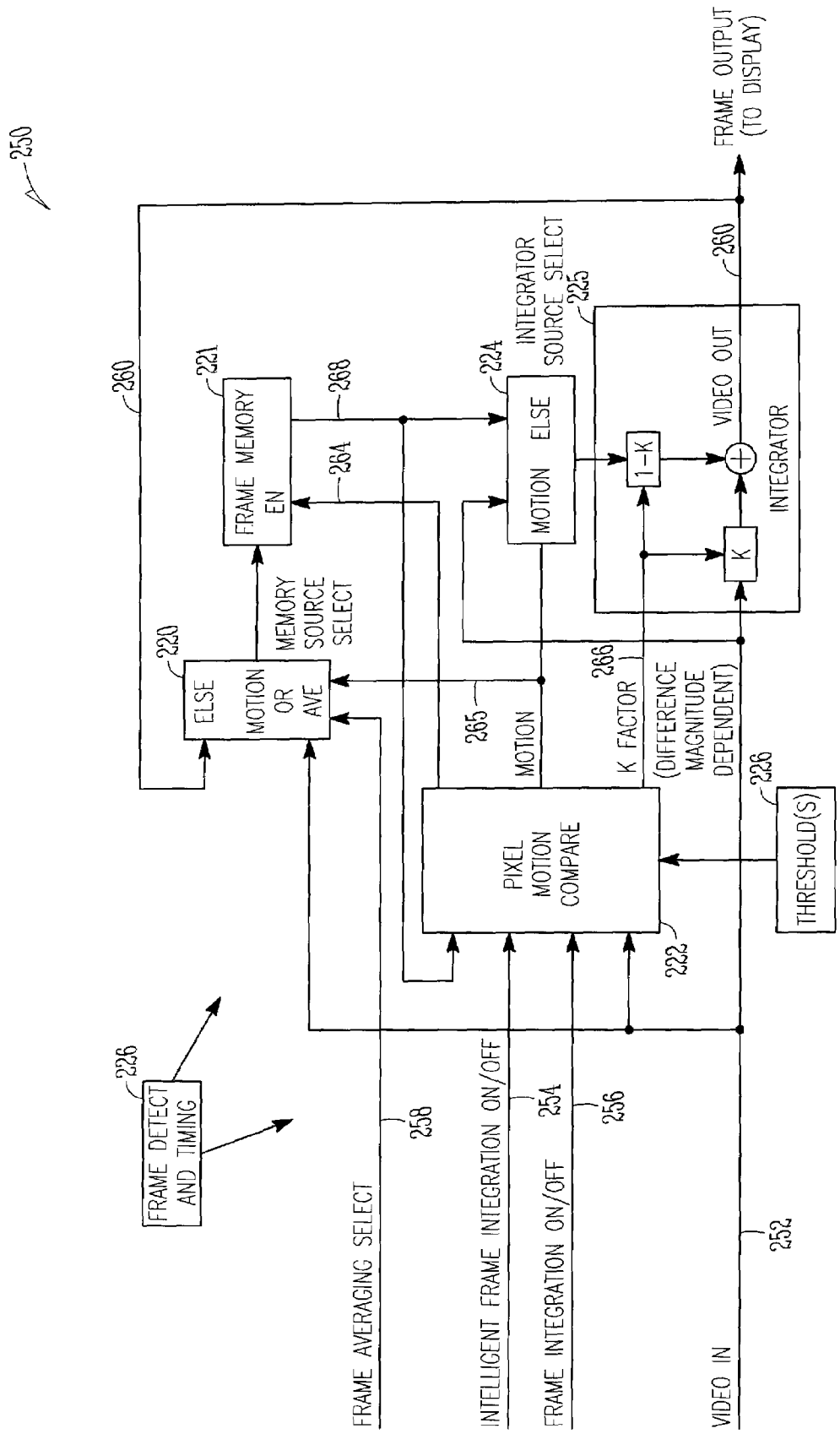
FIG. 2 is a functional block diagram of a frame processing system in accordance with other embodiments of the present invention.

FIG. 2 is a functional block diagram of a frame processing system in accordance with other embodiments of the present invention. Frame processing system 250 processes input video frames comprised of pixels and generates video output frames which may have an enhanced resolution or an improved signal to noise ratio (SNR) especially for non-moving portions of images. In some embodiments, system 250 may provide improved resolution. The video output frames generated by system 250 may also have reduced or eliminated motion artifacts for moving portions of images. In embodiments, system 250 may help reduce or eliminate motion artifacts resulting from frame averaging and/or other frame integration algorithms allowing moving objects to help maintain their normal shape and intensity. In embodiments, system 250 may perform frame averaging and/or other frame integration algorithms such as recursive type algorithms. System 250 may be suitable for use as frame integration device 104 (FIG. 1) although other devices may also be suitable for device 104 (FIG. 1).

In an embodiment, system 250 may perform a frame-averaging type of integration. System 250 may also perform recursive types of integration, and in some embodiments, may perform intelligent frame integration which refrains from performing integration for pixels determined to have motion. The motion determination is based on a threshold level which may be set based on intensity changes and/or color changes for corresponding pixels. In a multiple threshold embodiment, system 250 may utilize one or more thresholds to determine whether or not integration is performed for a particular pixel, and may select different frame integration averaging algorithms for the pixel based on the magnitude of the pixel motion. Furthermore, system 250 may change an integration factor (K) for pixels on a pixel by pixel basis depending on, for example, a level of motion determined for a particular pixel. This is explained further below. In these embodiments, the various thresholds and integration factors may be dynamically or statically selected depending on the operational environment of the system.

System 250 includes memory source select element 220, pixel motion comparison element 222, frame memory 221, threshold inputs 223, integrator source selection element 224, integrator 225 and frame detection and timing element 226. Memory source selection element 220, pixel motion comparison element 222 integrator 225, and integrator source selection element 224 may receive current input video frames 252 from an input device, such as device 102 (FIG. 1). Pixel motion comparison element 222 may also receive intelligent frame integration on/off input 254 and frame integration on/off input 256. Memory source select element 220 may receive frame averaging select input 258. Inputs 254, 256 and 258 may be provided by a user or system controller (not illustrated). Input 258 (i.e., frame averaging select) may also be algorithm controlled on a per pixel basis (e.g., for a multiple threshold embodiment).

Frame averaging select input 258 may instruct system 250 to perform either a frame-averaging type of frame integration, or a recursive type of frame integration. When frame-averaging integration is selected, memory source select element 220 provides a video frame from input video frames 252 to frame memory 221 allowing a comparison between a pixel of a current frame and a corresponding pixel of a prior input frame. When recursive frame integration is selected, memory source select element 220 may provide accumulated multi-frame equivalent 260 to frame memory 221 allowing a comparison between a pixel of the current frame with corresponding pixels of one or more prior output frames. Frame memory 221 may store at least one frame's worth of video pixels and may be disabled by memory enable input 264 when system 250 is not performing frame integration.

Pixel motion comparison element 222 may compare, on a pixel by pixel basis, a pixel from an input frame of input video 252 with a pixel provided by frame memory output 268. The frame in memory may depend on whether frame-averaging integration has been selected, or recursive frame integration is selected. When frame-averaging integration is selected or enabled, the current frame and prior frame may be mixed or combined in integrator 225. When intelligent frame integration is selected or enabled, pixels may be determined to have motion depending on at least one or more thresholds which are provided by threshold inputs 223. Integration may be performed for pixels that do not have motion which may be indicated by motion output signal 265. For pixels having motion, integration may be performed with the pixel from the current frame video 252 being provided to integrator 225 by integrator source selection element 224 effectively resulting in no integration for that pixel determined to have motion.

In one embodiment, pixel motion comparison element 222 may provide a revised or updated integration factor 266 to integrator 225 for a particular pixel. The revised or updated integration factor may be based on the amount of motion determined for that particular pixel and may be based on its relation to one of the thresholds. Thresholds may be defined by operators or users depending on the operational environment of system 250. In some embodiments, the thresholds may depend on the particular integration algorithm used by integrator 225. In some embodiments, the thresholds may be varied for small moving objects as determined by a target size discriminator.

Pixel motion comparison element 222 may provide memory enable signal 264 which may disable frame memory 221 to reduce power consumption when frame integration is not selected. Pixel motion comparison element 222 may provide motion output signal 265 which may indicate when a pixel is determined to have motion when frame integration and intelligent frame integration are selected and the particular pixel exceeds a threshold. When frame integration is not selected, motion signal 265 may also be provided to integrator source selection element 224 to select current frame video 252. The integrator performs a self-integration effectively resulting in no integration.

In some embodiments, pixel motion comparison element 222 may provide integration factor (K) 266 to integrator 225. The integration factor may range from zero to one, and may be constant or algorithmic. For example, the integration factor may be a function of the difference in pixel magnitude between the input video and video in the frame memory.

Integrator source selection element 224 may act as a multiplexer and may receive motion signal 265 from pixel motion comparison element 222. When motions signal 265 is a one, a pixel from the current frame video 252 may be fed to memory 221, otherwise output 260 is fed to memory 221. Selection element 224 may select a pixel from input video frames 252 or memory output 268 for providing to integrator 225 depending on motion signal 265. Integrator 225 may perform a pixel by pixel integration with a pixel from current frame video 252 and a pixel provided by selection element 224.

Integrator 225 may scale pixels from current frame video 252 by the integration factor (K) and may scale pixels from video input frames provided by selection element 224 by (1-K). In some embodiments, the integration factor may be held constant, while in other embodiments, the integration factor may be provided by pixel motion comparison element 222. Integrator 225 may combine (e.g., sum) the scaled video inputs to generate video output 260 which may be provided to an output device, such as device 106 (FIG. 1).

In embodiments, pixel motion comparison element 222 may dynamically change the integration factor on a pixel by pixel basis. In these embodiments, integrator source selection element 224 may be eliminated and memory output 268 may be provided directly to integrator 225. Frame detection and timing element 226 may detect a start of a frame and provide timing to the various elements of system 250.

In accordance with embodiments, for larger targets on a display, such as output device 106 (FIG. 1), the use of intelligent frame integration may eliminate or at least help reduce motion artifacts which may be unpleasant to viewers. For smaller targets on a display, the frame integration artifacts may be desirable and may actually help with target detection. For example, in the case of a small target (e.g., a few pixels) moving across the display screen, the size of the target may be only a couple pixels wide and may be very bright compared to a sky background. With a frame averaging algorithm and without the selection of intelligent frame integration, the target's shape may be deformed (e.g., longer) and the intensity may be cut in half. This may reduce target visibility, but increases target display "hang" time on screen. On the other hand, when single threshold intelligent frame averaging is applied, the target shape and visibility may be more normal, but display "hang" time may be less than that when frame averaging is applied. When recursive integration is applied the display "hang" time may be greatly increased, however the target shape may be compromised and target position may be several frames delayed depending on the particular algorithm. When increased target detection is desired, an increased target "hang" time on screen may be acceptable and may increase the target size so that a small object may be more easily detected or better seen.

In embodiments, a multi-threshold intelligent frame integration system and a target size discrimination system is provided. In one embodiment, a target size discriminator, such as target sized discriminator 108 (FIG. 1) may detect a small, bright target and may provide a signal to the multi-threshold comparator (e.g., element 222), indicating a small target, which may be treated different than a larger target. The multi-threshold comparator may be configured such that when target size discriminator is not on, motion/no motion thresholds may be used and intelligent frame integration may be applied to these pixels. When the target size discriminator is on, up to three or more levels of thresholds: motion/no motion, small motion and large motion, may be used. When a target has motion and motion is significant (e.g., target front end), the integration factor may be increased so that the target intensity and shape will be less compromised and intelligent frame integration is performed. When target has less significant motion and the magnitude is smaller than the previous frame (e.g., a target tail end or sides), the integration factor may be adjusted to mix in portions of previous frame data to enhance brightness to elongate display "hang" time. In some embodiments, frame averaging select signal 258 may be selected on a per pixel basis so that a pixel is effectively switching to recursive type of integration to enhance the display "hang" time. With variable integration factor 226, some disadvantages of recursive integration are reduced allowing the shape and intensity of small target to remain intact while increasing the display "hang" time. When a target is traveling at an angle on the display (e.g., not purely horizontal or vertical), the use of multiple thresholds may cause the target to become larger making it easier for an operator to detect.

Although systems 100 (FIG. 1) and system 250 (FIG. 2) are illustrated as having several separate functional elements, one or more of the functional elements may be combined and may be implemented by combinations of software configured elements, such as computing or processing elements including digital signal processors (DSPs), and/or other hardware elements such as programmable gate arrays, including field programmable gate arrays (FPGAs). For example, when processors or processing elements are used, processing elements may comprise one or more microprocessors, DSPs, application specific integrated circuits (ASICs), and combinations of various hardware and logic circuitry for at least performing the functions described herein.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

In some embodiments, the present invention provides a computer readable medium having program instructions stored thereon for performing the operations illustrated by systems 100 (FIG. 1) or 250 (FIG. 2). In these embodiments, the program instructions (e.g., software or firmware) may perform an intelligent frame integration procedure when executed within a digital processing device. In embodiments, the present invention may also provide an article comprising a storage medium having stored thereon instructions, that when executed by a computing platform, result in an intelligent frame integration process. The storage medium may be a computer readable medium and may, for example, be a compact disc, a magnetic disc, or semiconductor memory.

Figure 3:
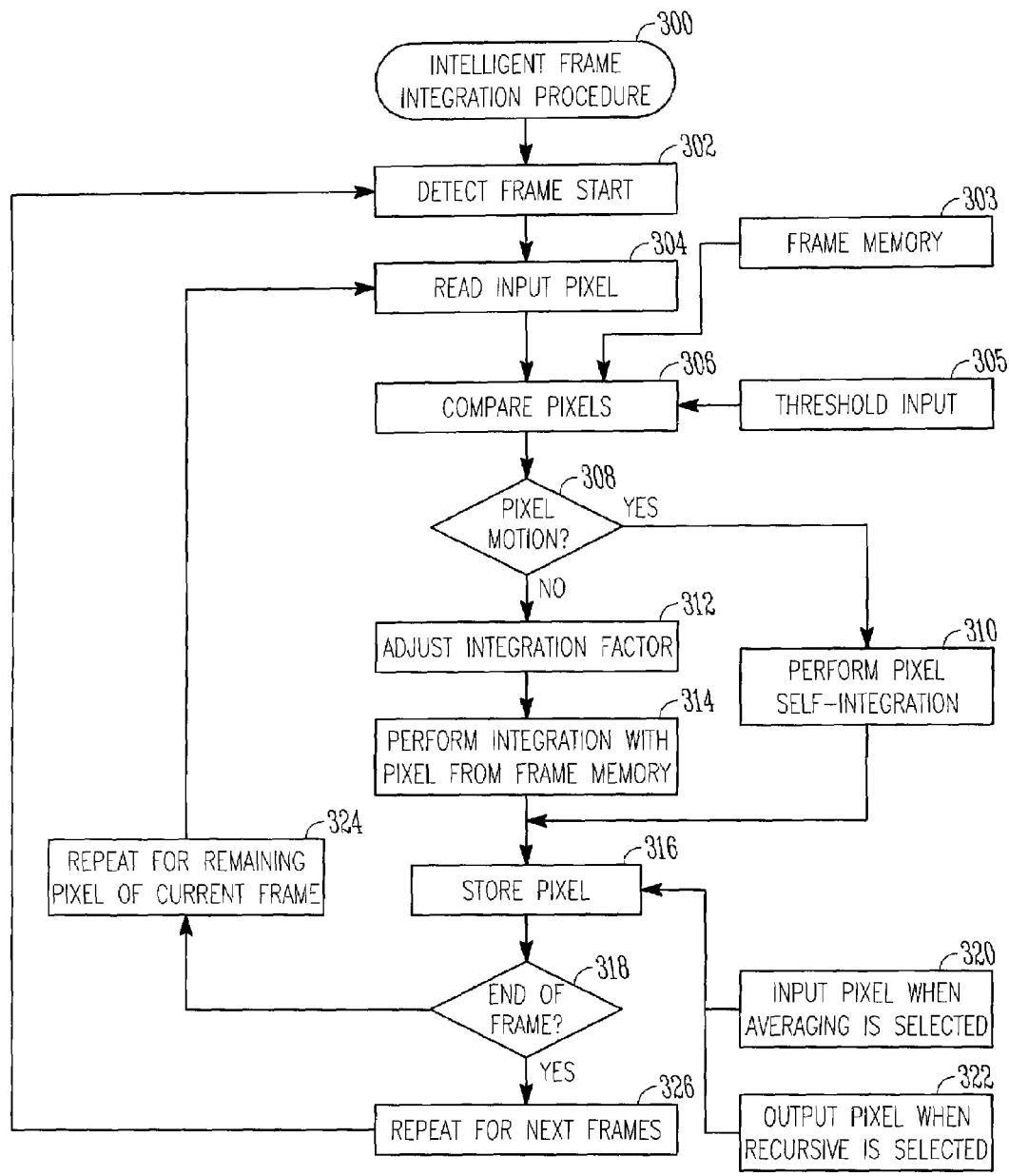
FIG. 3 is a flow chart of an intelligent frame processing procedure in accordance with embodiments of the present invention.

FIG. 3 is a flow chart of an intelligent frame processing procedure in accordance with embodiments of the present invention. Procedure 300 may be performed by frame processing system 250 (FIG. 2), although other devices and systems may also be suitable for performing procedure 300.

In operation 302, the start of a frame is detected and pixels of the frame may be identified. Operation 302 may, for example, be performed by frame detector 226 (FIG. 2). The start of the frame detected in operation 302 may be the start of one frame in a sequence of frames.

In operation 304, at least one input pixel from the current frame may be read. Operation 306 compares the pixels from the current frame with a corresponding pixel from frame memory 303 to determine when the difference exceeds a threshold. When frame integration on/off 256 (FIG. 2) is de-selected, no comparison is needed and operation 306 may be refrained from being performed. One or more thresholds may be provided by threshold input 305. The comparison performed by operation 306 may be a pixel by pixel comparison between intensities and/or colors of corresponding pixels. In one embodiment, operation 306 may be performed by pixel motion comparison element 222 (FIG. 2) which may generate a motion signal when the pixel difference exceeds the threshold. Operation 308 determines whether or not the motion signal indicates motion.

Operation 310 is performed when the motion signal does indicate motion and operation 312 is performed when the motion signal does not indicate motion. Operation 310 performs a pixel self-integration in which, integration may be performed with current pixels rather than pixels from the frame memory. This may effectively result in no integration for pixels having motion.

In operation 312, an integration factor may be adjusted before performing integration in operation 314. Per pixel algorithmic control may have been applied and the integration factor may be adjusted on a per pixel basis. In operation 314, integration may be performed using the adjusted integration factor and a pixel from frame memory and a corresponding pixel from a current frame.

Operation 316 may store input pixel 320 when frame averaging is selected, and may store output pixel 322 when recursive frame integration is selected. Operation 318 determines whether an end of the frame has been reached. When the end of the frame has not been reached, operation 324 repeats operations 304 through 318 for other pixels of the frame. When the end of the frame has been reached, operation 326 may repeat operations 302 through 318 for a next frame. An output frame may then be provided to a display device, such as device 106 (FIG. 1).

Although the individual operations of procedure 300 are illustrated and described as separate operations, one or more of the individual operations may be performed concurrently and nothing requires that the operations be performed in the order illustrated.

Figure 4A:
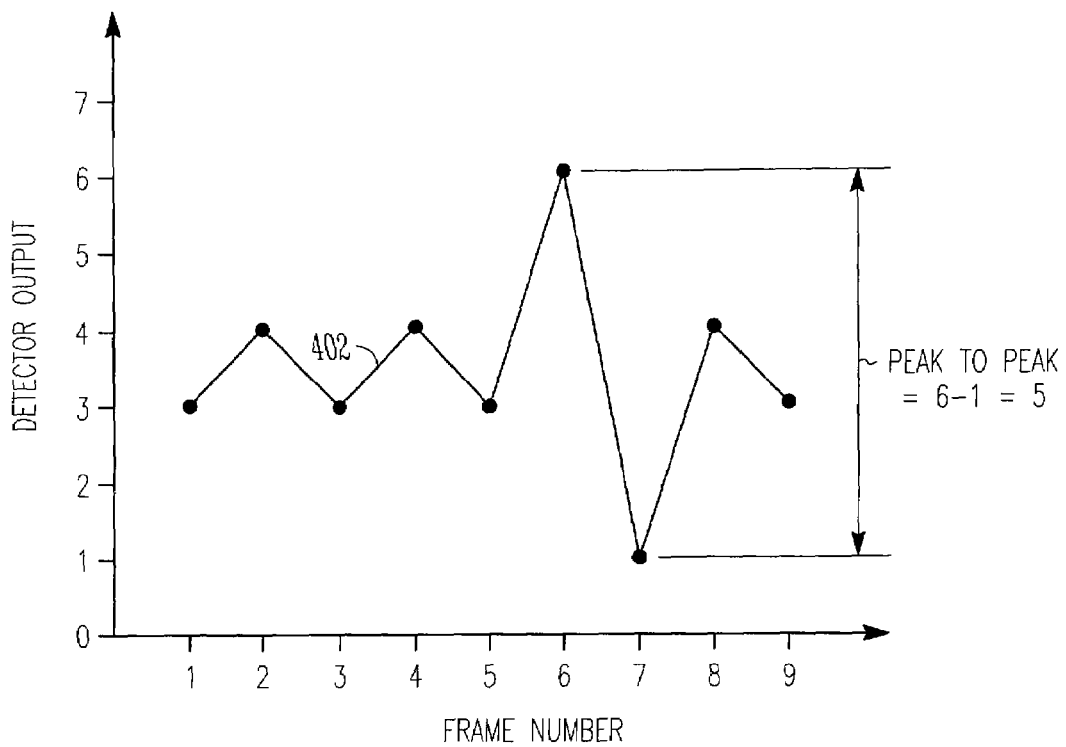
FIGS. 4A and 4B illustrate an example of a detector output for one pixel in a steady-state scene.
Figure 4B:
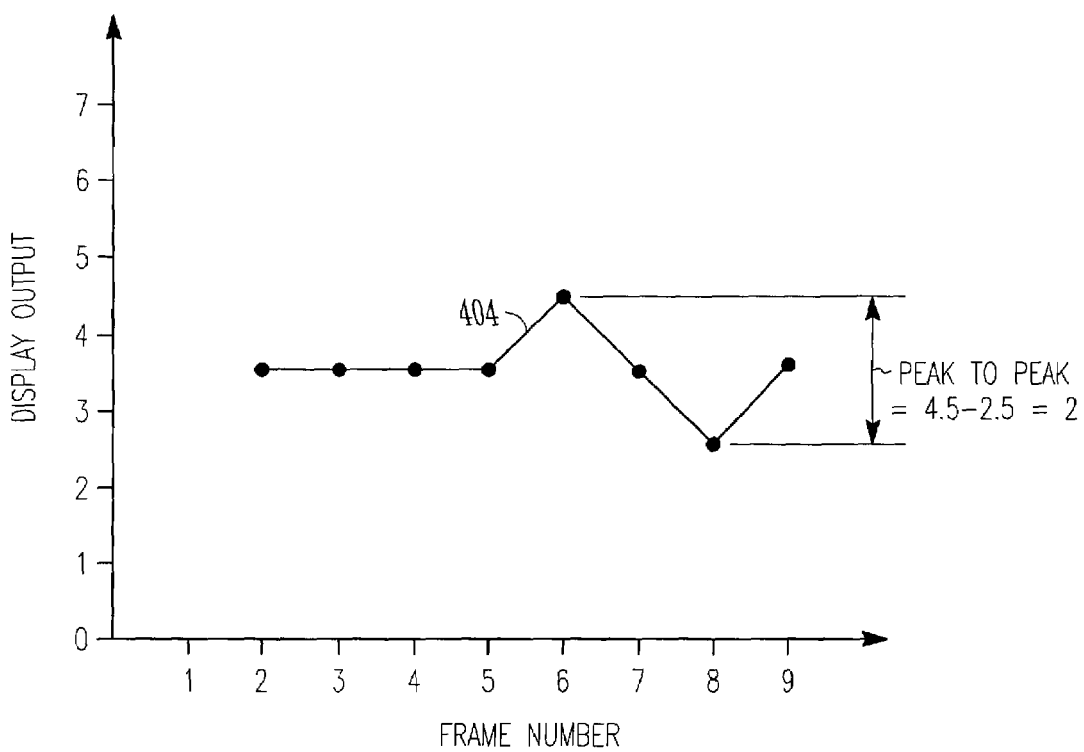

FIGS. 4A and 4B illustrate an example of a detector output for one pixel in a steady-state scene. As illustrated in FIG. 4A, normal output 402 of a detector element for one pixel may vary or bounce between values of three and four from frames one through five as illustrated. Bias spikes at frames six and seven may cause extra ripple at the detector output. The detector may go back to normal after the bias settles. FIG. 4B shows the effect of applying a two-frame averaging process to the detector output. The process, for example, may take 50% from the current frame and 50% from the prior frame detector output and sum them together to generate video output 404, which may be displayed. Accordingly, output video noise is reduced. One problem with this process is that motion artifacts may be generated for portions of the image that are moving. This is illustrated in the frame-to-frame activities discussed below.

Figure 5:
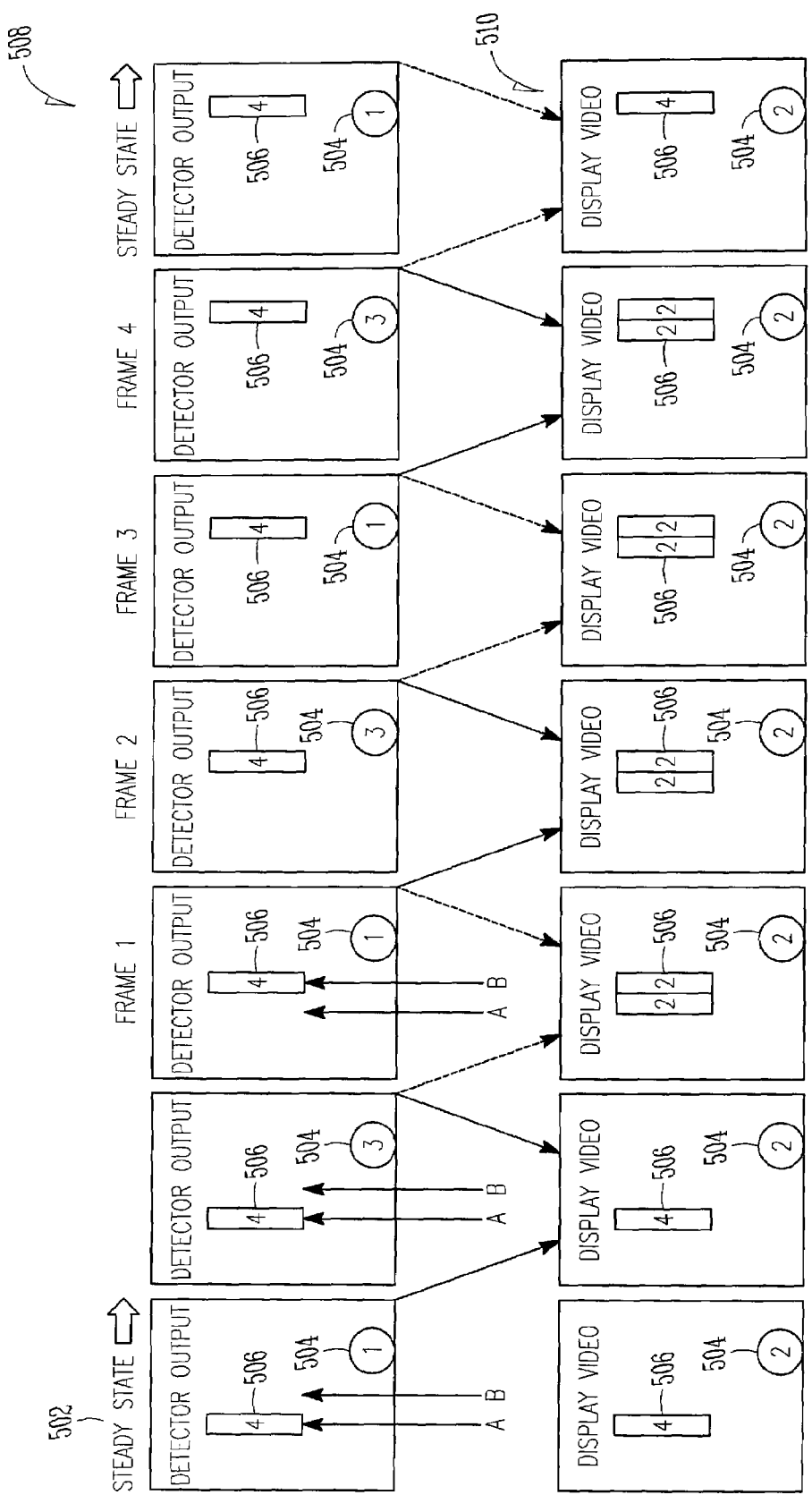
FIG. 5 illustrates displayed video of a scene with stationary and moving objects in accordance with conventional imaging systems.

FIG. 5 illustrates displayed video of a scene with stationary and moving objects in accordance with conventional imaging systems. At steady state 502, the detector may identify circular target 504 and rectangular target 506. In this example, the circular target remains still while the rectangular target moves across the scene from left to right in frames one through four and then stops. When there is noise on circular target 504 (i.e., the intensity varies from frame to frame), the noise may show up on detector output 508.

When the two-frame averaging process discussed above is applied to the detector outputs, the noise on the circular target 504 may be reduced on target 504 and may show up on display output 510 as a more-steady target when moving across frames of display output 510. Rectangular target 506 may show up on detector output 508 at its normal shape and intensity, however when motion occurs in frames one through four, target 506 appears to be stretched (e.g., a motion artifact) and it's intensity may be cut in half as illustrated by a wider image in frames one through four of display output 510. When the motion ends after frame four, the motion artifact may disappear on display output 510 and target 506 may go back to its normal shape and intensity.

In this example, rectangular target 506 may have an intensity of, for example, say 4 times a basic intensity at steady state, as well as in frames one through four of detector output 508. On display output 510, rectangular target 506 may have an intensity of, for example, four times the basic intensity at steady state, and half or two times the basic intensity during frames one through four due to frame averaging. In this example, circular target 504, on the other hand, may have an intensity which may bounce between a basic intensity and three times the basic intensity on a per frame basis over frames one through four of detector output 508 as well as at steady state. On display output 510, circular target 504 may have an intensity of, for example, two times the basic intensity at steady state and during frames one through four. The use of a number of times a basic intensity is not intended to imply any sort of maximum intensity. The intensity levels are used for illustrative purposes for comparison with other example intensity levels.

Figure 6:
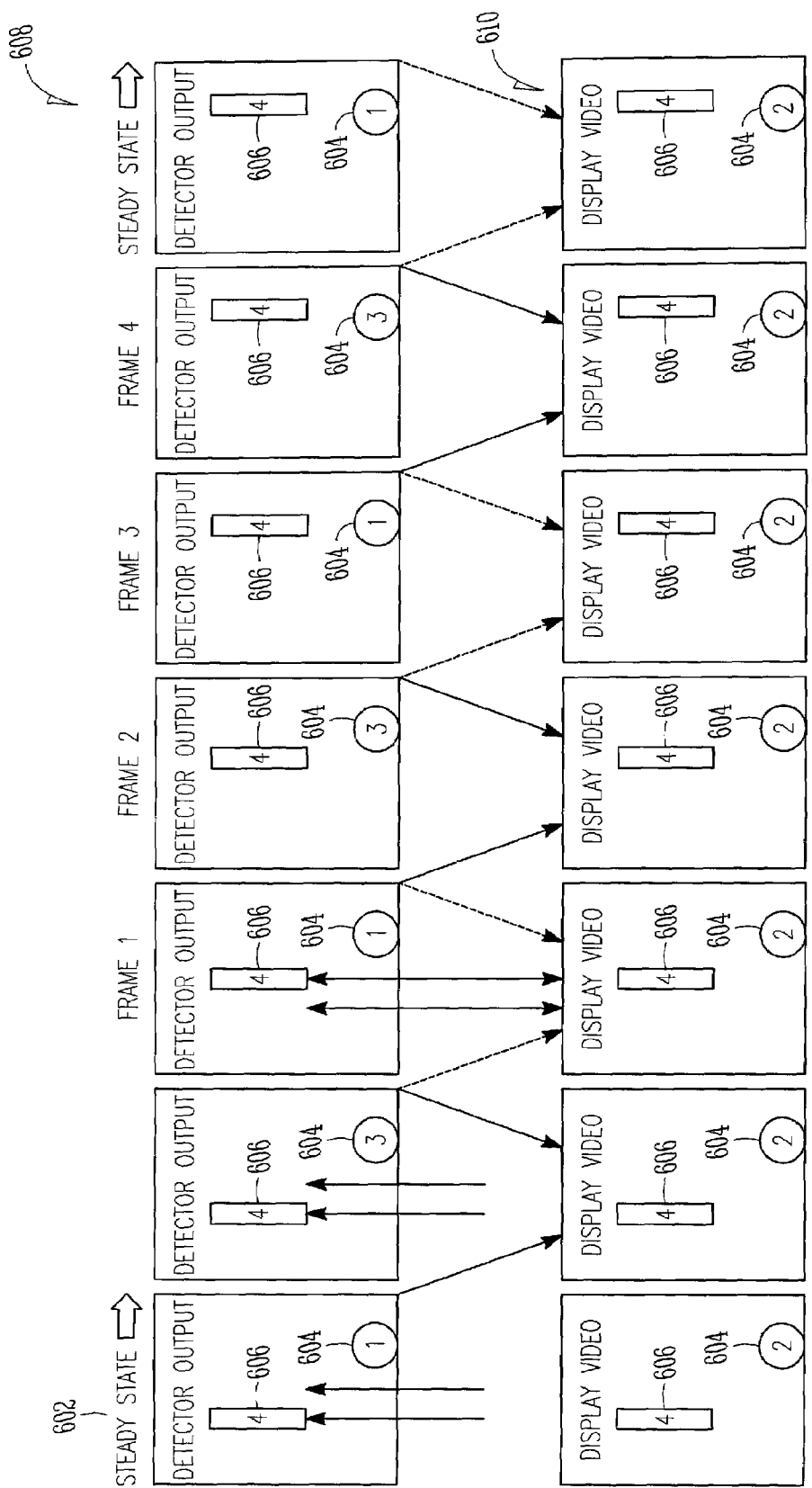
FIG. 6 illustrates the displayed video of the scene of FIG. 1 in accordance with embodiments of the present invention.

FIG. 6 illustrates the displayed video of the scene of FIG. 1 in accordance with embodiments of the present invention. FIG. 6 illustrates the same scene conditions as FIG. 5 in which an averaging or integration process is applied to pixels that may not be moving, such as pixels of target 604, while the averaging or integration process is disabled for pixels of targets that are moving, such as target 606 in frames one through four. Accordingly, for moving targets, motion artifacts may be reduced or eliminated while some of the noise reduction benefits may be lost. As illustrated in FIG. 6, when the frame-to-frame noise on circular target 604 does not exceed the threshold, an integration process may be applied to pixels associated with target 604. This allows circular target 604 to show up on display output 610 with noise reduced from that on detector output 608. For rectangular target 606, the integration process may be applied at steady state 602 because there is little or no motion. When the rectangular target starts to move in frame one, areas 612 and 614 may experience large scene changes which may be greater than the motion threshold allowing the integration process to be disabled for these pixels. Detector output 608 for frames one through four in areas where target 606 transitions between fields may be provided directly to display output 610 allowing the rectangular target to maintain its normal shape and intensity without the generation of any motion artifacts.

In this example, similar to FIG. 5, rectangular target 606 may have an intensity of, for example, say 4 times a basic intensity at steady state, as well as in frames one through four of detector output 608. On display output 610 however, rectangular target 606 may have an intensity of, for example, four times the basic intensity at steady state as well as during frames one through four, thus illustrating the elimination of motion artifacts. In this example, similar to FIG. 5, circular target 604 may have an intensity which may bounce between a basic intensity and three times the basic intensity from frame to frame over frames one through four of detector output 608 as well as at steady state. On display output 610, circular target 604 may have an intensity of, (similar to FIG. 5), for example, two times the basic intensity at steady state and during frames one through four.

Thus, an improved imaging system and method has been described. An imaging system and method that may reduce or eliminate artifacts caused by frame integration due to moving objects while still reducing the noise effects on stationary objects has also been described. An imaging system and method that may enhance small target display time has also been described.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. An airborne target identification system comprising:
   a frame processing system to receive input frames from an input device and generate output frames for an output device; and
   a target size discriminator to determine a size of a target within the input frames and to change a threshold for pixels that comprise the target based on the size of the target and to adjust an integration factor used by a selected integration process for integrating pixels that comprise the target based on the size and motion of the target,
   wherein the frame processing system comprises:
   a pixel motion comparison element to compare a pixel of a current input frame and a corresponding pixel from a frame memory;
   an integrator to perform the selected integration process on the pixel of the current input frame; and
   an integrator source selection element responsive to a control signal from the pixel motion comparison element to provide the pixel from the current frame to the integrator instead of the pixel from the frame memory when a difference between the pixel of the current input frame and a corresponding pixel from the frame memory exceeds the threshold,
   wherein when the difference does not exceed the threshold, the integrator performs the selected integration process using the pixel from the current input frame and the corresponding the pixel from the frame memory to generate an output frame,
   wherein when the difference exceeds the threshold, the integrator performs the selected integration process using the pixel from the current input frame in place of the pixel from the frame memory to generate the output frame, and
   wherein the changing of the threshold and the adjustment of the integration factor by the target size discriminator enhances the target's hang time on the output device for improved target identification and detection.

2. The system of claim 1 wherein the selected integration process is either a frame-averaging integration process or a recursive-type integration process.

3. The system of claim 1 wherein when the selected integration process is a frame-averaging integration process, the frame memory stores a prior input frame, and
   wherein when performing the selected integration process, the integrator integrates the pixel of the current frame with a corresponding pixel of the prior input frame from the frame memory.

4. The system of claim 1 when the selected integration process is a recursive type integration process, the frame memory stores prior output frames, and
   wherein when performing the selected integration process, the integrator integrates the pixel of the current frame with a corresponding pixel of at least one of either the prior output frames or an accumulated multi-frame equivalent of the prior output frames from the frame memory.

5. The system of claim 1 wherein the frame processing system, the input device, the output device, and the target size discriminator are located on an aircraft, and
    wherein the input device is one of a high-resolution camera device, an infrared sensor device, an RF sensor device, or a thermal imaging device.

6. The system of claim 1 wherein the integrator scales pixels from a current frame by the integration factor and scales pixels provided by the integrator source selection element by one minus the integration factor.

* * * * *